Patented Nov. 25, 1930

1,782,744

UNITED STATES PATENT OFFICE

WIRT D. RIAL, OF WILMINGTON, AND WHITFORD R. BARRATT, OF PALOS VERDES ESTATES, CALIFORNIA, ASSIGNORS, BY MESNE ASSIGNMENTS, TO RICHFIELD OIL COMPANY OF CALIFORNIA, OF LOS ANGELES, CALIFORNIA, A CORPORATION OF DELAWARE

PROCESS FOR RECOVERING WASTE CLAYS

No Drawing. Application filed January 5, 1927. Serial No. 159,236.

This invention relates to a method for the recovery of waste or spent clays, used in the purification of petroleum, and it has particular reference to the treatment of such clay to remove from them the adhering impurities absorbed by them in the treatment of petroleum oils, and it also relates to the method of treating oils with the recovered clay.

The object of the invention is to provide a simple method for this purpose by which spent and otherwise waste clay and clayey products that have been used for the purification of oils may be restored to original condition whereby they may be re-used indefinitely and with better success than clay and clayey products which have before been used, and whereby this recovered clay restored to its original condition may be rendered efficient in the subsequent treatment of hydrocarbon oils for the purification of same.

Spent clay, which is clay that has been used in the purification of petroleum oils and which has been coated or charged with oil and impurities in the form of gums, resinoids and other objectionable substances which render the clay inefficient for further use, is first washed with naphtha to remove the oil carried thereby or contained therein. Thereupon the clay so treated and freed of its oil content, is treated with a solvent which dissolves out and removes from the clay the oil insoluble compounds, such as the gums, resinoids, unsaturated compound deposits and other objectionable substances, which have remained in the clay. The solvent which we prefer to use is one obtained from acid sludge by separating the water soluble constituents therefrom to produce an acid oil, or one produced from the distillation of acid oil. This solvent may be made by any of the well known methods of hydrolyzing sulpho-acids derived from an acid treatment of a petroleum oil, in which steam or water is used. By the term "acid oil" we mean an oil which has been produced by subjecting sulpho-acids or sludge obtained in the treatment of petroleum oils with sulphuric acid, to the action of hot water or steam, to hydrolyze the sludge with the formation of an oil and dilute sulphuric acid, separating the oil from the dilute sulphuric acid and then washing the said produced oil with water until free from soluble constituents. The oil resulting from this treatment is known in refinery parlance as "acid oil", and it does not mean an oil exhibiting acid properties, but one from which these properties have been substantially removed.

This solvent acid oil may be produced by any of the well-known methods of hydrolyzing sulpho-acids or acid sludge, produced in the operation of refining petroleum oils, with water or steam, and which, we believe, is composed principally of cyclic hydrocarbons containing sulfur in chemical combinations; also a portion of this oil may be of the hydroxyl groups.

After thoroughly washing or treating the clay with the solvent and removing the dissolved impurities therefrom, the major portion of solvent is drained off. The clay is then again washed with naphtha to remove all traces of the solvent liquid, and thereupon the naphtha with its solvent content is removed from the clay. The mixture of naphtha and the solvent used may then be distilled to separate the respective liquids, which may be re-used in treating other clays.

The clay which is now freed of all objectionable substances by the various treatments mentioned, is thereupon heated to a temperature between 180° F. and 400° F. and superheated steam or any other fluid being introduced during such heating to eliminate any objectionable odor which may attach to the clay by reason of the solvent used. This heating of the clay is also employed in vaporizing the light portions remaining from the last naphtha wash or treatment.

The introduction of steam into the treated clay not only eliminates odors, but also replaces water of hydration which was originally in the clay before the treating operation. This hydration of the clay with steam renders it more efficient as a decolorizing agent.

We have also found that it is necessary, in order to make the recovered clay efficient, to introduce into the stock to be treated, water in the approximate amount of 10% by weight of clay used. The percent of water necessary to use depends upon the grade and character of the oil to be treated, and such introduction may be made either before, after, or simultaneously with the recovered clay.

By this method we are able to treat used clays again and again, without impairing the efficiency of the clay product. In fact, we find that the retreated clay, compared with an equal amount of new or fresh clay, is superior to the new clay now used; namely, magnesium silicate. By the use of this re-treated or restored clay we are able to obtain a much higher color in petroleum oils than with new clay, in addition to effecting a very considerable economy and saving in the operation of the treating branch of the oil industry.

By the term acid oil, we mean any oil or distillate of the same which has been produced by hydrolyzing acid sludge with steam or water. By the term acid sludge, we mean the sulpho-acids produced in the well known processes of refining petroleum oils, such as naphtha, lamp oil distillates and the like.

The above is not to be taken as limiting our invention, but merely as illustrative of the best method of carrying out our invention, and

What we claim, is:

1. A process of revivifying spent clays used in decolorizing and clarifying petroleum oils consisting in washing the spent clays with a solvent to remove petroleum oil constituents, then extracting the coloring matter from the clays with a solvent obtained from acid sludge by separating the water-soluble constituents therefrom, and then hydrating the clays thus treated.

2. A process of revivifying clays that have been used in clarifying and decoloring petroleum oils which consists in washing the used clays with naphtha to remove petroleum oil constituents therefrom, then extracting the coloring matter from the clays by washing them with a distillate of "acid oils" obtained from acid sludge by removing the water soluble constituents therefrom, and then hydrating the clays.

3. The process of revivifying spent clays that have been used in clarifying and decoloring petroleum oils which consists in washing the clays with naphtha to remove petroleum oil constituents, in then extracting the coloring matter from the clays by washing them with a solvent distillate obtained by the distillation of an "acid oil" from which the water-soluble constituents have been removed, then washing the clays again with naphtha to remove all traces of the solvent, separating the naphtha with its absorbed solvent content from the clays, subjecting the clays thus treated to heat to vaporize the light portions remaining from the last naphtha wash, and finally hydrating the clays.

4. A process of revivifying clays which have been used in clarifying and decolorizing petroleum oils, comprising, washing the clays with naphtha to remove petroleum oil constituents, then washing the clays with a solvent produced by the distillation of an "acid oil" from which the water soluble constituents have been removed to extract the coloring matter from the clays and then steaming the clays to eliminate odor and coincidentally therewith hydrate said clays.

In testimony whereof we have set our hands.

WIRT D. RIAL.
WHITFORD R. BARRATT.